(12) United States Patent
Calvert

(10) Patent No.: US 9,022,255 B1
(45) Date of Patent: May 5, 2015

(54) INSTANT EYE-SEALING WEAPON

(71) Applicant: IESW Associates, Trustee for Instant eye-sealing weapon CRT Trust, Manassas, VA (US)

(72) Inventor: S. Mill Calvert, Manassas, VA (US)

(73) Assignee: IESW Associates, Trustee for Instant eye-sealing weapon CRT Trust, Manassas, VA (US)

( * ) Notice: Subject to any disclaimer, the term of this patent is extended or adjusted under 35 U.S.C. 154(b) by 0 days.

(21) Appl. No.: 14/537,579

(22) Filed: Nov. 10, 2014

(51) Int. Cl.
*F41B 9/00* (2006.01)
*G01C 3/08* (2006.01)
*F41H 9/10* (2006.01)

(52) U.S. Cl.
CPC .............. *F41B 9/0087* (2013.01); *F41B 9/0003* (2013.01); *G01C 3/08* (2013.01); *F41H 9/10* (2013.01)

(58) Field of Classification Search
CPC ........ F41B 9/00; F41B 9/0015; F41B 9/0021; F41B 9/0059; F41B 9/0068; F41B 9/0075; F41B 9/0087; F41B 9/0096; F41H 13/00; F41H 9/10; G01C 3/08
USPC ............. 222/132, 135, 144.5, 145.1, 192, 52, 222/63, 333, 527, 78, 79; 239/306, 418; 42/1.08
See application file for complete search history.

(56) References Cited

U.S. PATENT DOCUMENTS

| | | | | |
|---|---|---|---|---|
| 2,136,024 | A * | 11/1938 | Schneider | ...................... 427/426 |
| 3,464,770 | A * | 9/1969 | Schmidt | ........................ 356/4.01 |
| 4,058,921 | A | 11/1977 | Mason | |
| 4,826,048 | A * | 5/1989 | Skorka et al. | .................. 222/137 |
| 5,088,624 | A * | 2/1992 | Hackett et al. | ................... 222/78 |
| 5,225,623 | A | 7/1993 | Krasnow | |
| 5,397,029 | A | 3/1995 | West | |
| 5,427,320 | A * | 6/1995 | Mak et al. | ................... 239/587.5 |
| 5,503,304 | A * | 4/1996 | Keller et al. | ................... 222/175 |

(Continued)

FOREIGN PATENT DOCUMENTS

| | | | | |
|---|---|---|---|---|
| DE | 9209754 U1 * | 11/1992 | ................ F41H 9/10 |
| DE | 10123341 A1 * | 11/2002 | ................ F41H 9/10 |
| GB | 1045847 A * | 10/1966 | ............ F41B 9/0075 |

OTHER PUBLICATIONS

Instantbond, Technical Data Sheet, http://www.instantbond.com/downloads/TECHNICALDATASHEET.pdf, p. 1.*

(Continued)

*Primary Examiner* — Daniel R Shearer
*Assistant Examiner* — Nicholas J Weiss
(74) *Attorney, Agent, or Firm* — Louis Ventre, Jr.

(57) ABSTRACT

A weapon is usable instantly seal a person's eyes when fired into a target's face. The weapon includes a container that is removably attached to a barrel of a firearm. Once removed, it can be used independently of the firearm. The weapon includes a central processing unit mounted within the container. The container holds three or more bottles, each containing one of a cyanoacrylate adhesive base, an activator to speed curing of the adhesive base, and a chemical agent to affect the target. At a minimum, the adhesive base and the activator may be ejected to form a single stream which cures or hardens within 10 seconds. Additionally, the contents of various chemical agents may also be ejected into the single stream as may be preselected by the shooter using a selector switch or a touch screen display.

6 Claims, 2 Drawing Sheets

(56) References Cited

U.S. PATENT DOCUMENTS

| | | | |
|---|---|---|---|
| 5,656,035 A * | 8/1997 | Avoy | 604/191 |
| 5,671,559 A | 9/1997 | Ludaesher et al. | |
| 5,673,436 A * | 10/1997 | Piper | 2/160 |
| 5,787,628 A | 8/1998 | Teetzel | |
| 5,983,548 A | 11/1999 | Ludaescher | |
| 6,050,454 A * | 4/2000 | Ludaescher et al. | 222/162 |
| 6,658,779 B2 * | 12/2003 | Bauer et al. | 42/1.08 |
| 7,118,013 B2 * | 10/2006 | Wakatsuki et al. | 222/386 |
| 7,490,738 B2 * | 2/2009 | Crews | 222/145.5 |
| 2014/0048561 A1 * | 2/2014 | Mangold | 222/153.11 |

OTHER PUBLICATIONS

PSI Adhesive Spray, Alibaba, http://www.alibaba.com/product-detail/PSI-ACDC-Adhesive-and-Marker-Spray__50002157926.html, all pages.*

* cited by examiner

INSTANT EYE-SEALING WEAPON

TECHNICAL FIELD

In the field of firearms, a weapon that discharges an instant adhesive to seal a person's eyes in a closed position and also to deliver a chemical agent.

BACKGROUND ART

When it comes to technology in military conflicts and wars, there are varying levels of force against an enemy that may be desired. Lethal force and one-shot kill is not the desired level of force in all situations. Many times there are other desired results, such as: silence an enemy so he cannot call out to fellow soldiers; remove an enemy's sight temporarily so he cannot see what is going on around him; render an enemy unconscious; put an enemy to sleep; disable and immobilize an enemy; infect the enemy with a highly contagious disease or virus that he will take back to his fellow soldiers; poison or drug an enemy; tranquilize an enemy; have a drug such as a truth serum put into the enemy's body; contaminate the enemy with a very painful condition such as a burning, itching skin rash; drive the enemy mad or to mental imbalance; paralyze the enemy's body; or put the enemy's body and health in such a bad position that his fellow soldiers will be in terror when they see him and do not understand what technology has done this to him. These are just some of the many various levels of force against an enemy that may be desired to accomplish specific military objectives.

SUMMARY OF INVENTION

A weapon is disclosed that can be used to instantly seal a person's eyes when fired into a target's face. The weapon includes a container that is removably attached to a barrel of a firearm. Once removed, it can be used independently of the firearm. The weapon includes a central processing unit mounted within the container. The container holds three or more bottles, each containing one of a cyanoacrylate adhesive base, an activator to speed curing of the adhesive base, and a chemical agent to affect the target. At a minimum, the adhesive base and the activator may be ejected to form a single stream which cures or hardens within 10 seconds. Additionally, the contents of various chemical agents may also be ejected into the single stream as may be preselected by the shooter using a selector switch or a touch screen display.

The weapon is discharged by pressing one or more activator buttons. Each activator button is connected to the central processing unit, which then controls which contents to eject and at what rate. One activator button may be located on the container so that when the weapon is detached from the firearm, it may be used independently of the firearm.

A nozzle may be used to constrain and angle an ejection tube for each bottle so that a single ejection stream is formed. Optionally, the nozzle may be rotated about an axle to alter a direction of the single stream to address targets at different distances. A laser range finder may be used with the central processing unit to automatically change the direction of the single stream. The contents may be under pressure in the bottles or a pump may be used for ejection of the contents.

Technical Problem

There are many different tools to use instead of just one shot one kill. Most of the levels of force involve agents or things that affect the biology of the enemy's body. They may involve drugs, chemical agents, sickness agents, and pharmaceutical agents, and might otherwise be administered in a medical laboratory containment-type facility.

It would be useful if there were a new technology available to a Special Forces soldier. The soldier on the ground uses a standard issue gun and it would be advantageous to have an accessory to enable use of these other levels of force technologies on the enemy, instead of just shooting him dead. It would be even better if this new accessory gave the soldier the ability to select among various different force technologies that may be specifically tailored to the changing circumstances found in the field. This would give the soldier a whole new line of military options and tools to accomplish assigned objectives and then return home safely.

Solution to Problem

The weapon has now been invented that gives the soldier on the ground a whole new line of varying levels of force tools. The weapon is a new accessory called the instant eye-sealing weapon.

The instant eye-sealing weapon is a compact high-tech device that fastens onto the front area of the soldier's weapon which could be either a riffle or a pistol. The instant eye-sealing weapon has one or more nozzles that will shoot or spray a high pressure solution onto the enemy.

The instant eye-sealing weapon has an assortment of various solution cartridges or bottles that can be easily added or removed if a different solution mixture is needed.

The instant eye-sealing weapon has a selector switch or control unit so the soldier can choose what solution or combination solution to shoot at the enemy.

The instant eye-sealing weapon may utilize a high pressure pump or pressurized aerosol gas or both.

The instant eye-sealing weapon preferably shoots a pinpoint stream of the desired solution onto the enemy. One of the primary solution cartridges or bottle that the instant eye-sealing weapon will have is an ultra-quick super glue. The soldier can quickly shoot this into the face of the enemy and as he blinks his eyelids will be glued shut and he will be blinded by eyelids that are sealed closed. Shooting this solution onto the face will also glue the enemy's lips together to silence him.

The soldier can also select some of the other chemical agents to be mixed in with the glue solution or he can shoot them separately. For instance, if the soldier wanted to capture a terrorist for intelligence gathering, he may select a glue/knockout drug combination, so he could instantly and quietly silence, blind and render the enemy unconscious.

If the soldier wanted to quietly kill the enemy, he could select a deadly poison/glue combination to silence, blind, and drop the enemy dead.

There are many different solution combinations that the soldier can select to use on the enemy that will be custom tailored to accomplish his mission.

The instant eye-sealing weapon can have a convenient RF or wired trigger that can be attached to the trigger glued on the soldier's gun so he can easily move his finger forward to activate the instant eye-sealing weapon, or pull his finger back on the gun's trigger to fire a bullet from the gun.

The instant eye-sealing weapon will not in any way interfere with the use or working of the regular gun. The soldier can fire the instant eye-sealing weapon at the enemy, he can fire a bullet from the gun at the enemy, or he can do both.

The instant eye-sealing weapon can also be taken off the gun and held by hand to fire.

Advantageous Effects of Invention

The instant eye-sealing weapon is a new technology that will open up a whole new line of military tools and options for the soldier on the ground to custom tailor various force level technologies that will help him to accomplish his mission and return home safely.

BRIEF DESCRIPTION OF DRAWINGS

The drawings illustrate preferred embodiments of the Instant eye-sealing weapon according to the disclosure. The reference numbers in the drawings are used consistently throughout. New reference numbers in FIG. 2 are given the 200 series numbers. Similarly, new reference numbers in each succeeding drawing are given a corresponding series number beginning with the figure number.

DESCRIPTION OF EMBODIMENTS

In the following description, reference is made to the accompanying drawings, which form a part hereof and which illustrate several embodiments of the present invention. The drawings and the preferred embodiments of the invention are presented with the understanding that the present invention is susceptible of embodiments in many different forms and, therefore, other embodiments may be utilized and structural, and operational changes may be made, without departing from the scope of the present invention.

Figure 1:
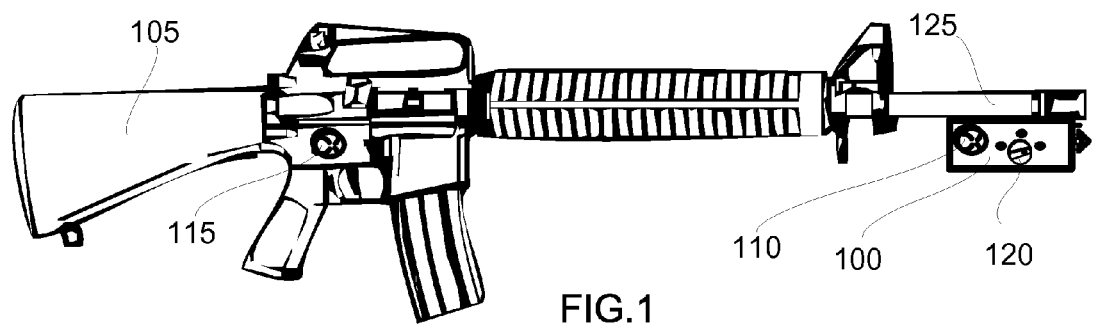
FIG. 1 is a side elevation view of a preferred embodiment of an instant eye-sealing weapon attached to the barrel of a firearm.
Figure 2:
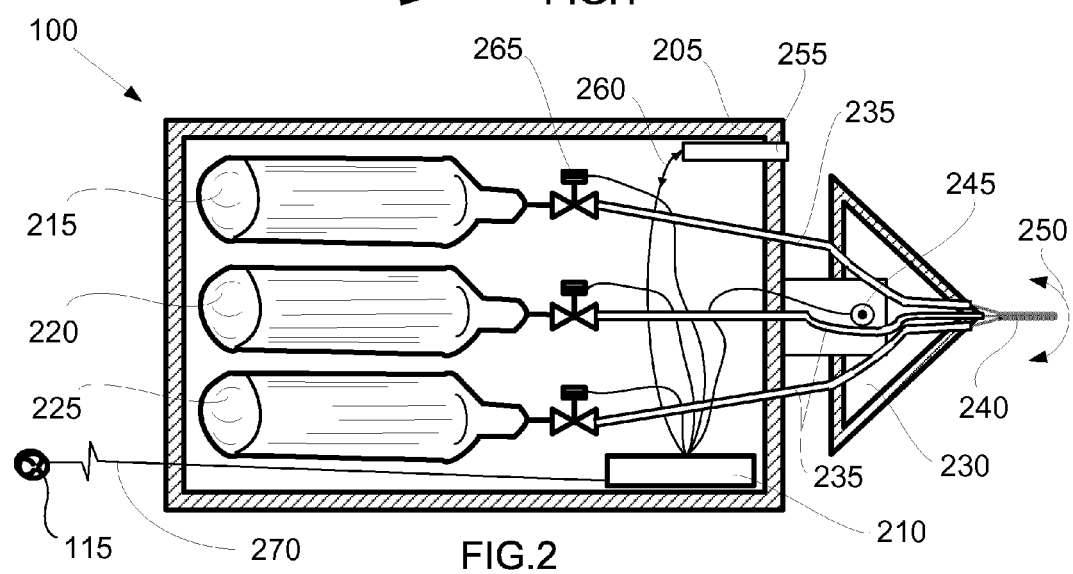
FIG. 2 is a side sectional view of the embodiment of FIG. 1 showing a plurality of bottles, central processing unit, valves and nozzle arrangement.
Figure 3:
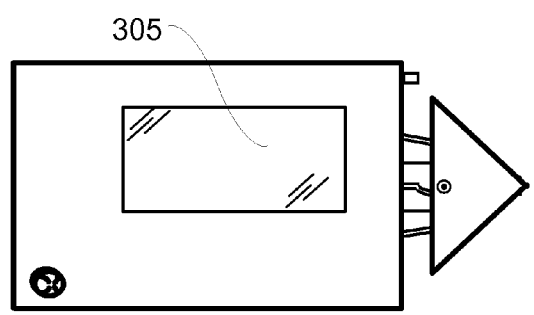
FIG. 3 is a side view of an alternative embodiment of an instant eye-sealing weapon equipped with a touch screen display.
Figure 4:
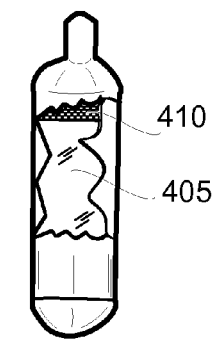
FIG. 4 is a side elevation view of a bottle showing pressurizing fluid over the usable content in the bottle.
Figure 5:
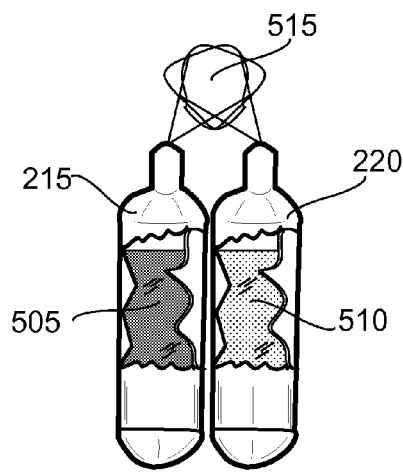
FIG. 5 is a side elevation view of the two bottles holding a cyanoacrylate adhesive base and an activator, which when combined form a glue.
Figure 6:
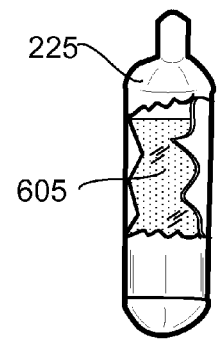
FIG. 6 is a side elevation view of a third bottle containing a chemical agent.
Figure 7:
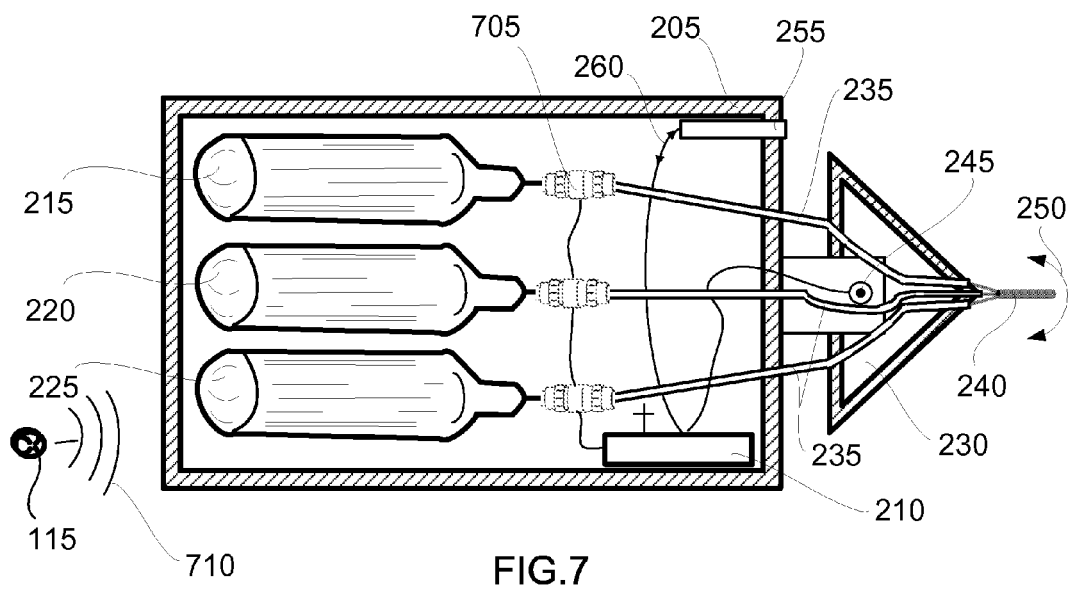
FIG. 7 is a side sectional view of the embodiment of an alternative embodiment of an instant eye-sealing weapon equipped with pumps to discharge bottle contents.

FIG. 1 illustrates a preferred embodiment of an instant eye-sealing weapon deployed on the barrel (125) of a firearm (105), which in this case is a rifle. The firearm (105) may be a pistol, or other portable gun, such as a revolver or semi-automatic pistol.

The weapon (100) is intended as an instrument capable of instantly sealing closed a targeted person's eyes when the weapon (100) is discharged into the face of a targeted person.

The weapon (100) includes: a container (205); a central processing unit (210); a plurality of bottles within the container (205); a first activator button (110) and optionally, a second activator button (115); a selector switch (120) or optionally, a touch screen display (305); optionally, a nozzle (230); optionally, an axle (245) to rotate the nozzle (230); optionally, a laser range finder (255) to aim the nozzle (230); and optionally, a pump (705) or pressurizing fluid (410).

The weapon (100) is removably attachable to a barrel (125) of a firearm (105), There are numerous means for removably attaching accessories to a firearm (105). One is the Picatinny rail, also known as a MIL-STD-1913 rail, STANAG 2324 rail, or tactical rail. The Picatinny rail is a bracket having a T-shaped cross-section interspersed with flat spacing slots. It is attached to the firearm to provide a standard mounting platform for accessories and attachments. Accessories may be mounted either by sliding them on from one end of the rail or the other. Alternatively, or in conjunction with the Picatinny rail, a Weaver rail mount may be use. The Weaver rail mount is often used to connect telescopic sights and other accessories to rifles, shotguns, and pistols. It uses a pair of parallel rails and several slots perpendicular to these rails.

The central processing unit (210) is housed or mounted within the container (205). It is preferable that the central processing unit (210) is attached so as to be shielded or protected from the elements, such as rain or snow. The central processing unit (210) controls whether or not a particular bottle opens to release contents and when opened, the rate of release of the contents in the plurality of bottles so that the right amounts of each content (405) is ejected and mixed together upon activation by the shooter.

The plurality of bottles is housed within the container (205) and includes at least a first bottle (215), a second bottle (220) and a third bottle (225). The plurality of bottles is adapted to eject content (405) contained within each bottle in the plurality of bottles. Ejection may be due to a pressurizing fluid (410), such as nitrogen or other gas, within the bottle or it may be by action of a pump (705), for example one similar to a high pressure water pistol pump.

The first bottle (215) with first content has a cyanoacrylate adhesive base (505), preferably Ethyl-2-cyanoacrylate. The cyanoacrylate adhesive base (505) is itself an adhesive that will typically cure over a longer period of time than needed for application in the weapon (100) so that it becomes an instant eye-sealing weapon.

The second bottle (220) holds a second content, which is an activator (510) for the cyanoacrylate adhesive base (505). The activator (510) works to speed curing of the glue (515) when mixed with the cyanoacrylate adhesive base (505). The mixing of the contents of the first bottle (215) and the second bottle (220) creates a glue (515) that cures in a period of time between 1 and 10 seconds, which in other words cures in a time period to be useful for delivering an instant eye-sealing weapon. Since cyanoacrylate will polymerize rapidly on contact with water, the activator (510) is preferably a water solution. The use and existence of an aerosol spray activator or accelerator to hasten the curing of cyanoacrylate is commercially available, for example, as a product called INSTANT-BOND.

The third bottle (225) holds a third content comprising a chemical agent (605). The chemical agent (605) may be a tranquilizer, a sleeping agent, a poison, an infectious agent or any other chemical agent having an effect on the target person or the people the target person comes in contact with.

The first activator button (110) is connected to the central processing unit (210), for example by wire (270) or radiofrequency signal (710), so that its activation function operates and is controlled by the central processing unit (210). The first activator button (110) when pressed causes the central processing unit (210) to initiate ejection of content (405) from the plurality of bottles. Preferably, this content includes whatever combination is pre-selected by the shooter. For example, the shooter might select the first content and the second content when only the fast acting glue (515) is wanted. In another example, the shooter might select to initiate ejection of the first content, second content and third content. In another example, the shooter might select to initiate ejection of only the chemical agent (605). There may be more than three contents and so, the central processing unit (210) will control the ejection of any combination of the contents contained within the plurality of bottles within the container (205). Preferably the shooter will have a choice of what combination of contents to deliver to suit the particular conditions in the field.

The selector switch (120) permits selection of the content for ejection when the activator (510) button is pressed. The selector switch (120) is connected to the central processing unit (210), so that whatever combination of bottles is selected using the selector switch (120), the central processing unit (210) can implement the selection made by the shooter. Alternatively, a touch screen display (305) may offer the shooter more choices than a selector switch (120), especially when the weapon (100) contains more than 3 bottles where each bottle in excess of the two bottles needed to create the glue (515), contains a different chemical agent. Any one or any combination of glue and/or chemical agents can then be easily programmed for selection by the shooter using the touch screen display (305).

The weapon (100) of claim 1 may include a nozzle (230) to better focus the ejection of content (405) from the plurality of bottles. The nozzle (230) includes and organizes an ejection tube (235) for each bottle in the plurality of bottles. This separate ejection tube (235) helps to maintain separation of the contents until ejected. The nozzle (230) also helps form a single stream (240) ejected from the nozzle (230) because each such ejection tube (235) is preferably angled to cause the content (405) exiting each such ejection tube (235) to combine into a single stream (240).

The axle (245) is the joint about which the nozzle (230) can be rotated to alter a direction (250) of the single stream (240) exiting the nozzle (230). It permits changing the elevation of the single stream (240) to suit targets at different distances from the shooter. Alternatively, the nozzle (230) may be mounted on a ball joint so that the nozzle may be angled in a wider variety of angles up and down and left and right.

The laser range finder (255) may be connected to the central processing unit (210) so that the central processing unit (210) can change or alter the direction (250) of the single stream (240) based on data (260), that is the distance to the target, provided by the laser range finder (255).

The pump (705) is connected to a bottle in the plurality of bottles so as to cause the ejection of the content of the bottle upon command received from the central processing unit (210). The pump (705) is defined to include, but is not limited to, a motorized small piston sometimes found in water pistols. The pump (705) may be used to pump air into a partially filled reservoir for each content (405), similar to the design of SUPER SOAKER water pistols. Alternatively, the pump (705) may be an electric pump that pushes content (405) directly out the nozzle (230) or other ejection orifice.

The pressurizing fluid (410) is preferable within one or more of the plurality of bottles. The pressurizing fluid (410) in a bottle is used in conjunction with a valve (265) connected to the bottle. The valve (265) is controlled so as to open and release at a desired rate the content (405) from the bottle. The valve (265) permits the ejection of the content of the bottle upon command received from the central processing unit (210).

The second activator button (115) may be used as a second button to fire the weapon (100). For example, it may be attached at a convenient location on a rifle. The second activator button (115) is connected to the central processing unit (210). The second activator button (115) when pressed causes the central processing unit (210) to initiate ejection of the content pre-selected by the shooter using the selector switch (120) or the touch screen display (305).

The above-described embodiments including the drawings are examples of the invention and merely provide illustrations of the invention. Other embodiments will be obvious to those skilled in the art. Thus, the scope of the invention is determined by the appended claims and their legal equivalents rather than by the examples given.

INDUSTRIAL APPLICABILITY

The invention has application to the firearms industry.

What is claimed is:

1. A weapon for instantly sealing a person's eyes, the weapon comprising:
   a container removably attachable to a barrel of a firearm;
   a central processing unit mounted within the container;
   a plurality of bottles within the container, the plurality of bottles adapted to eject content contained within each bottle in the plurality of bottles, the plurality of bottles comprising:
      a first bottle with a first content comprising a cyanoacrylate adhesive base;
      a second bottle with a second content comprising an activator that when mixed with the cyanoacrylate adhesive base creates a glue that cures in a period of time between 1 and 10 seconds; and
      a third bottle with a third content comprising a chemical agent;
   a nozzle, the nozzle comprising an ejection tube for each bottle in the plurality of bottles, each such ejection tube angled to cause the content exiting each such ejection tube to combine into a single stream;
   an activator button connected to the central processing unit, the activator button when pressed causes the central processing unit to initiate ejection of at least one of the first, second and third contents; and
   a selector switch that permits selection of at least one of the first, second and third contents for ejection when the activator button is pressed.

2. The weapon of claim 1, further comprising an axle about which the nozzle can be rotated to alter a direction of the single stream.

3. The weapon of claim 2, further comprising a laser range finder connected to the central processing unit; and wherein the central processing unit alters the direction of the single stream based on data provided by the laser range finder.

4. The weapon of claim 1, further comprising a pump connected to at least one of the bottles in the plurality of bottles so as to cause the ejection of the content of the bottle upon command received from the central processing unit.

5. The weapon of claim 1, further comprising a pressurizing fluid within at least one of the bottles in the plurality of bottles; and a valve connected to the bottle, the valve operable to open so as to permit the ejection of the content of the bottle upon command received from the central processing unit.

6. A weapon for instantly sealing a person's eyes, the weapon comprising:
   a container removably attachable to a barrel of a firearm;
   a central processing unit mounted within the container;
   a plurality of bottles within the container, the plurality of bottles adapted to eject content contained within each bottle in the plurality of bottles, the plurality of bottles comprising:

a first bottle with a first content comprising a cyanoacrylate adhesive base;

a second bottle with a second content comprising an activator that when mixed with the cyanoacrylate adhesive base creates a glue that cures in a period of time between 1 and 10 seconds; and a third bottle with a third content comprising a chemical agent;

a first activator button connected to the central processing unit, the first activator button when pressed causes the central processing unit to initiate ejection of at least one of the first, second and third contents;

a selector switch that permits selection of at least one of the first, second and third contents for ejection when the first activator button is pressed; and a second activator button connected to the central processing unit and located on the firearm, the second activator button when pressed causes the central processing unit to initiate ejection of the first content and the second content.

* * * * *